June 5, 1962 R. B. MASON 3,037,843
ZEOLITES FROM CLAY MINERALS
Filed Dec. 10, 1958
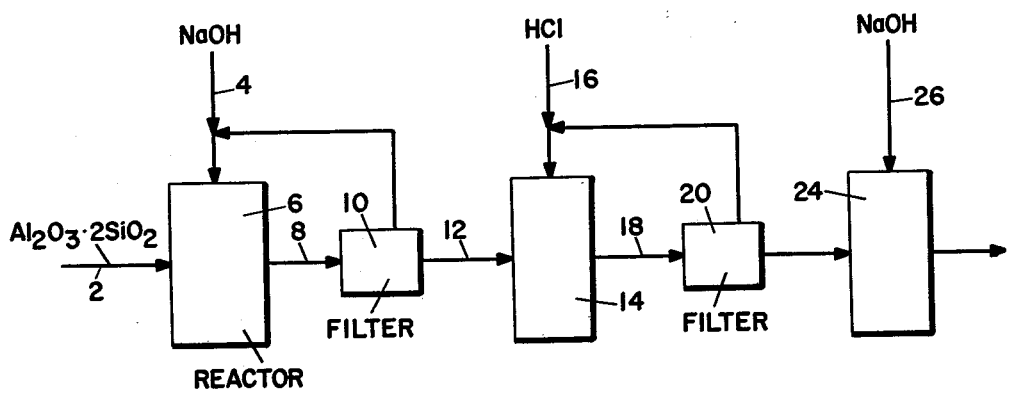
Ralph Burgess Mason INVENTOR
BY Richard N. Nagel
ATTORNEY 3,037,843
ZEOLITES FROM CLAY MINERALS
Ralph Burgess Mason, Denham Springs, La., assignor to Esso Research and Engineering Company, a corporation of Delaware
Filed Dec. 10, 1958, Ser. No. 779,485
8 Claims. (Cl. 23—112)

The present invention relates to the synthesis and manufacture of selective adsorbents adapted to be employed in the separation of molecular types, and in particular to the separation of branched chain from straight chain paraffins and olefinic hydrocarbons. More particularly, the present invention relates to the preparation of compositions having so-called "molecular sieve" properties. Still more particularly, the present invention relates to an improved process for the preparation of synthetic zeolites in a manner more effective, efficient, and economical than presently available.

It has been known for some time that certain natural zeolites, such as chabazites and analcite and the like have the property of selectively adsorbing normal hydrocarbons and rejecting the branched chain isomers. These zeolites have crystal patterns forming structures containing a large number of small cavities interconnected with a number of still smaller holes or pores. These ports are of exceptional uniformity of size and diameter. Only molecules small enough to enter the pores can be adsorbed. The pores may vary from less than 3 to more than 15 Angstrom units in diameter, but for any one zeolite the pores are of substantially uniform size.

The patent and scientific literature contains numerous references to the adsorbing action of natural and synthetic zeolites. Thus synthetic zeolites have been described, for instance, by Barrer (U.S. 2,306,610) and Black (U.S. 2,442,191). Zeolites, both natural and synthetic, vary considerably in composition, but most generally contain silicon, aluminum, oxygen, and an alkali and/or alkaline earth element, e.g. sodium and/or calcium, magnesium, etc. Analcite has the empirical formula $NaAlSi_2O_6 \cdot H_2O$ which on treatment with $Ca^{++}$ is converted, in subsequent dehydration, to the molecular sieve material $CaNa_2(Al_2Si_4O_{12} \cdot 2H_2O)_2$. In U.S. 2,442,191 a synthetic zeolite with molecular sieve properties having the empirical formula $4CaO \cdot Al_2O_3 \cdot 4SiO_2$ is described. Further description of these zeolites is found in the article "Molecular Sieve Action of Solids," Quarterly Reviews, vol. III, pages 293–330 (1949), published by the Chemical Society (London).

The separation of normal from branched chain, cyclic, or aromatic compounds has become an increasingly important industrial problem. Thus, motor fuels containing substantial amounts of normal paraffins have low octane numbers. On the other hand segregation of certain straight chain components from their mixtures with branched chain isomers makes available preferred starting materials for many synthetic products, as straight chain olefins for manufacture of alkyl aryl sulfonate detergents, or as feed to the olefin carbonylation process.

The naturally occurring zeolites having molecular sieve properties do not occur abundantly in nature and are expensive. Efforts in the past have been made to supply this deficiency by synthesis of compositions having molecular sieve properties. Though the preparation of zeolites has long been known, only a few have structures and crystal lattice patterns allowing the molecular separations described above. Those synthetic products prepared hitherto having sieve properties also have not been altogether satisfactory, either because of the cost of the preparation, the specificity of the use, or the activity of the product.

It is the principal purpose of the present invention to set forth a process for preparing synthetic zeolites having outstanding adsorption characteristics for straight chain organic compounds which is substantially simpler, more rapid, and cheaper than those hitherto known.

It is a further purpose of the present invention to set forth a superior process for synthesis and activation of compositions having molecular sieve properties in a continuous manner from cheap raw materials.

Other and further objects and advantages of the present invention will appear from the following description, drawing and claims.

In the past it has been proposed to make molecular sieves from silica gel and aluminum containing compounds such as the aluminates, or from water glass and sodium aluminate. Barrer (U.S. 2,413,134) described and formation of gels by the interaction of water glass and sodium aluminate solutions. These gels are gradually converted into crystalline materials on heating in aqueous or alkaline suspensions for about 24 hours at 200° C. Such a process is of relatively little value commercially because of the long reaction period required to convert gels into crystals. In a commercial operation it is important to minimize reaction time and prepare material that may readily be processed. Gels, for instance, such as formed in this prior art operation, are difficult to filter. Likewise, it has been suggested to prepare sieves from sodium silicates and sodium aluminates.

In accordance with the present invention, it has now been found that molecular sieves may readily be prepared from cheap and readily available clay minerals, such as kaolin, kaolinite, halloysite, bentonite, bauxite and other similar silica-alumina compositions by a three-step process. In the first step the clay mineral is treated with caustic at atmospheric or higher pressure and elevated temperature for a sufficient period of time to form a zeolite having the formula $Na_2O \cdot Al_2O_3 \cdot 2SiO_2 \cdot XH_2O$. Though this material is a crystalline sodium aluminosilicate and has an empirical formula identical with that of molecular sieves having 4 Angstrom pore openings, nonetheless it is non-adsorptive and is similar to or identical with hydroxy-sodalite. Thereafter, in the second stage, the crystalline precipitate is treated with an acid, preferably a mineral acid, to form the corresponding "permutitic" acid. These permutitic acids are in all probability miscellae, large colloid entities wherein the zeolite structure has been to a large extent retained, and wherein the outer sphere of the miscellae contains the hydrogen ions resulting from the acidification treatment. They are described, for instance, in a paper by Jenny, Journal of Physical Chemistry, vol. 36 (1932), page 2217.

In the third stage, the permutitic acid is converted to the 4 Angstrom sieve by treating with dilute alkali at elevated temperatures. This product is a crystalline sodium alumina-silicate having uniform pore openings of a size suitable for admitting $C_3$ or higher paraffins and olefins. These crystals may be modified in their adsorptive properties by replacing all or part of the sodium by another cation, such as calcium, by simple base exchange.

The process of the present invention may be more clearly understood when read in conjunction with the FIGURE, which is a diagrammatic representation of a preferred method of manufacturing the synthetic molecular sieve. Turning now to the drawing, a clay mineral, such as bauxite or uncalcined or calcined kaolin or kaolinite, is passed into reaction vessel 6. A stream of sodium hydroxide is passed into vessel 6 via line 4 and the mixture may be heated, preferably with agitation, for 0.5 to 20 hours. The alkali may have a concentration of 3 to 30%, and the amount of alkali based on clay may be 0.4 to 4 weight ratio. The temperature in vessel 6 may be from 200° to 500° F. and, if desired, elevated pressures from 1 to 400 p.s.i.g. may be employed.

The mixture may be passed via line 8 to filter the caustic recycled, and the precipitated hydroxysodalite, after washing, is passed to acidification reactor 14. Into this vessel there is passed a stream of dilute acid, preferably mineral acid such as HCl. In this treatment with dilute acid the permutitic acid is formed at pH values in the range of 3 to 4. The exact amount of acid depends upon (1) the residual alkalinity of the zeolite, (2) the intimacy of contact with the acid, (3) the basicity of the acid, and (4) the molecular weight of the acid. In general, it is preferred to employ hydrogen equivalents in the range of 0.4 to 0.7 per 100 parts by weight of dry zeolite. Thus with hydrochloric acid the range for hydrogen chloride ranges from 14.5 parts to 28 parts. The ratio of water to acid component is not critical at values corresponding to moderate dilution but ratios in the range of 10/1 to 25/1 are preferred.

The permutitic acid gel is preferably filtered and washed in 20 and passed to reactor 24. Here the material is further treated with caustic. However, it is important that both temperatures and concentrations be controlled. The temperature is maintained in the range of 180° to 220° F., preferably 200° to 215° F., and the concentrations are adjusted to fall in the following ranges, based on 100 parts by weight of hydroxysodalite charged to acidifier 14.

Sodium hydroxide _____ 40–160
Water _____ 170–3600

The above corresponds to an $H_2O/Na_2O$ mol ratio ranging from 30 to 100. The reaction is maintained under these conditions of temperature and concentration for varying periods of time, usually ranging from about 30 minutes to six hours but under optimum conditions of rapid heating and low $H_2O/Na_2O$ ratio even less times may be employed.

It is important to maintain the above-specified reaction conditions. More concentrated sodium hydroxide or higher reaction temperatures lead to the formation of undesirable non-adsorptive zeolitic products.

The product recovered from reactor 24 is a sodium alumino-silicate zeolite having uniform pore openings of 4 Angstrom units, and has an empirical formula

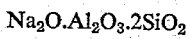

$Na_2O.Al_2O_3.2SiO_2$ this being essentially isomeric with the hydroxysodalite precursor.

The precipitated sodium alumino-silicate sieve is water washed and, though it may be recovered as such, it is preferably base exchanged with an alkaline earth metal, preferably calcium, to form the corresponding calcium-sodium alumino-silicate. The latter is characterized by having pore diameters somewhat larger than the pore diameters of the sodium alumino-silicate. The calcium alumino-silicate or calcium-sodium alumino-silicate produced by base exchanging the sodium alumino-silicate with a calcium salt solution has pores sufficiently large to admit straight chain paraffin and olefin hydrocarbons boiling in the gasoline boiling range; however, the pores of the calcium alumino-silicate are not large enough to admit branched chain or ring compounds. The calcium alumino-silicate is, therefore, generally more useful for petroleum processing than the sodium alumino-silicate.

The filter cake of sodium alumino-silicate is preferably base exchanged with a solution of a calcium salt or other salt solutions before drying. However, if desired the crystalline precipitate of sodium alumino-silicate may be dried and activated by heating to about 700° to 900° F. before base exchanging with a salt solution.

The process of the present invention may be modified in various ways, without departing from its spirit. Thus, if a source of sodalite or hydroxysodalite is available, the initial caustic treating step is avoided.

The scope of the invention is not limited to acidification of hydroxysodalite although the 2/1 silica/alumina ratio is an advantage in the formation of 4 Angstrom sieves. The amorphous zeolites particularly those of similar chemical composition may be used in this connection. This fixed ratio does not necessarily limit the operation to production of 4 Angstrom sieve. The higher silica to alumina sieves, such as the 13 Angstrom variety, can be prepared by this technique upon addition of a soluble silicate to the reaction mixture of reactor 24. This can be accomplished in similar operations with permutitic acid from crystalline zeolites such as analcite,

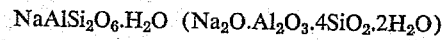

$NaAlSi_2O_6.H_2O$  $(Na_2O.Al_2O_3.4SiO_2.2H_2O)$ or from amorphous zeolites such as "Decalso" and/or "Duocil" $(Na_2O.Al_2O_3.5SiO_2)$.

In addition to conversion of zeolites from permutites of limited adsorption to sieves of good capacity, the permutitic acid technique also affords means of varying the silica to alumina ratio in the product. This is particularly true in preparation of the 13 Angstrom sieve and products of high adsorption capacity have been prepared with silica to alumina ratio approaching that of natural faujasite.

Further, if desired, the total product from the acidification reactor 14 may be treated with caustic under the desired conditions to produce the sieves.

The process of the present invention may be further illustrated by the following specific examples.

EXAMPLE 1

Part A

A charge of 44 grams of uncalcined kaolin (American standard), 48 grams of sodium hydroxide, and 830 grams of water was heated at 214° F. for 19 hours. The mol ratio of $Na_2O/SiO_2$ was 1.6 and of $H_2O/Na_2O$ was 77. The product was recovered by filtration, water washed, and dried. The material as evaluated by X-ray diffraction was sodalite.

Part B

A 20 gram portion of the product from Part A was suspended in 63 grams of water and 43 grams of dilute hydrochloric acid solution were added. This hydrochloric acid solution was prepared by diluting 35 grams of concentrated hydrochloric acid with water to a total weight of 105 grams. The acidified product, which had the appearance of a gel, was stirred at room temperature to provide good contact of the solid phase with the acid. No other treatment or purification was employed.

Part C

The acid gel in its entirety was diluted with water to the extent that the total weight was 338 grams. This corresponds approxmiately to 20 grams of starting material, 5 grams of hydrogen chloride, and 313 grams of water. This diluted suspension was heated to 210° F. and 39 grams of sodium hydroxide in 115 grams of water were added and the entire mixture was refluxed with stirring for 3 hours at 212° to 214° F. The ratio of $Na_2O/SiO_2$ was 2.3 and of $H_2O/Na_2O$ was 57. The product was recovered by filtration and was water washed and then was dried at 230° F. The dried material was examined by X-ray diffraction and was found to be a good grade of 4 Angstrom molecular sieve.

EXAMPLE 2

In a second example, kaolin and caustic in the $Na_2O/SiO_2$ mol ratio of 1.5 and $H_2O/Na_2O$ mol ratio of 77 were reacted at 350° F. for 2 hours to form hydroxysodalite. On acidification, the permutitic acid was treated with caustic ($Na_2O/SiO_2$—2.3; $H_2O/Na_2O$—57) for 2 hours at 215° F. to produce good yields of high purity 4 Angstrom sieve.

EXAMPLE 3

A 13 Angstrom sieve, having a formula $$0.9Na_2O \cdot Al_2O_3 \cdot 2.9SiO_2$$

was prepared from sodium aluminate and sodium metasilicate according to conventional procedures. The product had a silica to alumina ratio of 2.9. A charge of 20 grams was suspended in 350 ml. of water and was converted to permutitic acid upon reduction of the pH to 3 with dilute hydrochloric acid. The resulting permutitic acid was added by water transfer to a stirred solution at 170° F. containing 90.5 grams of sodium metasilicate (29.1% $SiO_2$) and 38.3 grams of sodium hydroxide. The temperature was rapidly elevated and agitation was continued under reflux for 17 hours at 214° to 216° F. The product was filtered, water washed and dried and was then analyzed by chemical analysis and by X-ray diffraction. The increase in silica to alumina ratio is shown by the following data:

| Method of Preparation | Conventional | Permutitic Acid |
|---|---|---|
| Feed | Sodium Metasilicate+ Sodium Aluminate+ Sodium Hydroxide | Permutitic Acid from Conv. Prep.+ Sodium Metasilicate+ Sodium Hydroxide |
| Mol Ratio, $SiO_2/Al_2O_3$ | 10 | 10. |
| Mol Ratio, $H_2O/Na_2O$ | 50 | 50. |
| Mol Ratio, $Na_2O/SiO_2$ | 1.6 | 1.6. |
| Product: | | |
| Mol Ratio, $SiO_2/Al_2O_3$ | 2.9 | 3.5. |
| X-ray Diffraction Pattern | 13 A. Sieve | 13 A. Sieve. |
| Capacity for n-heptane, cc./g. | 0.20 | 0.21. |

EXAMPLE 4

The above examples show either sieve formation or transformation when permutitic acids are reacted with either sodium hydroxide or alkaline silicate solution. However, when clays such as uncalcined kaolin or bauxite are treated with these same reagents without going through the permutitic acid stage, negative results were obtained. This is illustrated by the following data:

| Feed | Uncalcined Kaolin | |
|---|---|---|
| Reactant | Sodium Hydroxide | Sodium Metasilicate |
| Mol Ratio, $SiO_2/Al_2O_3$ | 2 | 7. |
| Mol Ratio, $H_2O/Na_2O$ | 77 | 52. |
| Mol Ratio, $Na_2O/SiO_2$ | 1.6 | 0.7. |
| Hours of Run | 19 | 24. |
| Temperature, °F | 212–214 | 212–214. |
| Product | Sodalite | Unreacted kaolin+ small amount of undetermined crystal. |

What is claimed is:

1. An improved process for the preparation of crystalline zeolitic adsorbents having molecular sieve properties which comprises reacting a permutitic acid at temperatures of from about 180 to 220° F. with a dilute solution of an alkaline reagent selected from the group consisting of alkali metal hydroxides and alkali metal silicates for a period of time to precipitate a crystalline zeolite having uniform pore openings.

2. The process of claim 1 wherein said reagent is an NaOH solution having an $H_2O$/NaOH mol ratio of 30–100/1.

3. The process of claim 1 wherein said reagent is a dilute solution of sodium silicate.

4. An improved process for preparing crystalline zeolitic adsorbents having molecular sieve properties from clay minerals which comprises treating said clay with sodium hydroxide under conditions whereby a non-adsorptive sodium alumino-silicate is formed, converting said sodium alumino-silicate with a mineral acid to a permutitic acid, and thereafter treating said permutitic acid with dilute sodium hydroxide at temperatures of from about 180 to 220° F. to produce a crystalline zeolite of high adsorptive properties.

5. An improved process for preparing crystalline zeolitic adsorbents having molecular sieve properties which comprises treating a clay mineral with about 3 to 30% alkali solution, said alkali being selected from the group of alkali metal hydroxides and alkali metal silicates at 150° to 500° F. for a period of about 0.5 to 20 hours to produce a crystalline sodium alumino-silicate having no measurable adsorptive properties, then reacting said product with a dilute mineral acid at a pH of about 3 to 4 to convert said product to a permutitic acid, and thereafter treating said permutitic acid at a temperature of about 180° to 220° F. with a dilute NaOH solution such that, based on 100 parts of said nonadsorbent sodium alumino-silicate, the NaOH content of said solution is 40 to 160 parts and the $H_2O$ content is 170 to 3600 parts, heating said mixture for a period of at least 30 minutes, and recovering high yields of pure adsorptive zeolite having uniform pore openings of about 4 Angstroms.

6. The process of claim 5 wherein said zeolite is base exchanged with an aqueous solution of an alkaline earth salt to replace at least a portion of the sodium content thereof.

7. The process of claim 5 wherein said clay mineral is kaolin.

8. The process of increasing the silica content of a crystalline zeolite which comprises reacting said zeolite with a mineral acid whereby a permutitic acid is formed, thereafter reacting said permutitic acid with an alkaline solution of sodium silicate at temperatures from about 180 to 220° F. to recover a crystalline zeolite of high adsorptive capacity.

References Cited in the file of this patent

UNITED STATES PATENTS

| 1,121,490 | Gans | Dec. 15, 1914 |
| 1,918,361 | Wiberg | July 18, 1933 |
| 2,544,695 | Kumins | Mar. 13, 1951 |
| 2,882,242 | Milton | Apr. 14, 1959 |

OTHER REFERENCES

Kumins et al.: "Ind. and Eng. Chem.," 45, 567–72 (1953).

Mellor: "Comprehensive Treatise on Inorganic and Theoretical Chemistry," vol. 6, pp. 567–584, 640–655, Longmans, Green and Co., N.Y., 1925.